US009930568B2

United States Patent
Murray et al.

(10) Patent No.: US 9,930,568 B2
(45) Date of Patent: Mar. 27, 2018

(54) METHOD AND APPARATUS FOR COORDINATING CHANGE OF OPERATING FREQUENCY

(75) Inventors: Joseph M. Murray, Schwenksville, PA (US); Chunxuan Ye, San Diego, CA (US); Zinan Lin, Melville, NY (US); Jean-Louis Gauvreau, La Prairie (CA); Alpaslan Demir, East Meadow, NY (US); Angelo A. Cuffaro, Laval (CA); Rocco DiGirolamo, Laval (CA); James M. Miller, Verona, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 499 days.

(21) Appl. No.: 14/002,044

(22) PCT Filed: Feb. 27, 2012

(86) PCT No.: PCT/US2012/026749
§ 371 (c)(1),
(2), (4) Date: Dec. 10, 2013

(87) PCT Pub. No.: WO2012/118740
PCT Pub. Date: Sep. 7, 2012

(65) Prior Publication Data
US 2014/0086208 A1    Mar. 27, 2014

Related U.S. Application Data

(60) Provisional application No. 61/447,512, filed on Feb. 28, 2011.

(51) Int. Cl.
H04W 72/04 (2009.01)
H04W 28/04 (2009.01)
(Continued)

(52) U.S. Cl.
CPC ..... *H04W 28/048* (2013.01); *H04W 36/0072* (2013.01); *H04W 36/08* (2013.01); *H04W 72/0406* (2013.01); *H04W 36/06* (2013.01)

(58) Field of Classification Search
CPC .............................. H04W 72/04; H04W 28/04
See application file for complete search history.

(56) References Cited

U.S. PATENT DOCUMENTS

2001/0039183 A1   11/2001   Kobayashi et al.
2010/0035553 A1   2/2010    Shinada et al.
(Continued)

FOREIGN PATENT DOCUMENTS

CN   101932067 A   12/2010
JP   2001-098763 A   4/2001
(Continued)

OTHER PUBLICATIONS

Wang et al., First Cognitive Radio Networking Standard for Personal/Portable Devices in TV White Spaces, Apr. 6-9, 2010.*
(Continued)

*Primary Examiner* — Jae Y Lee
*Assistant Examiner* — Aixa Guadalupe-Cruz
(74) *Attorney, Agent, or Firm* — Condo Roccia Koptiw LLP

(57) ABSTRACT

Methods and apparatus are described. According to a method, a wireless transmit/receive unit (WTRU) communicates with a base station using a first base station operating frequency and a set of cell configuration parameters. The WTRU receives information indicating a second base station operating frequency to use for communications with the base station at a given time. The WTRU communicates with the base station using the second base station operating frequency and the same set of cell configuration parameters on or after the given time.

20 Claims, 13 Drawing Sheets

(51) Int. Cl.
*H04W 36/00* (2009.01)
*H04W 36/08* (2009.01)
*H04W 36/06* (2009.01)

(56) References Cited

U.S. PATENT DOCUMENTS

| | | | |
|---|---|---|---|
| 2010/0035601 A1* | 2/2010 | Chen | H04W 4/20 455/423 |
| 2010/0323714 A1 | 12/2010 | Schmidt et al. | |
| 2010/0330919 A1 | 12/2010 | Gurney et al. | |
| 2011/0286401 A1* | 11/2011 | Wijting | H04W 16/14 370/329 |
| 2012/0134328 A1 | 5/2012 | Gavreau et al. | |

FOREIGN PATENT DOCUMENTS

| | | |
|---|---|---|
| JP | 2001-298763 A | 10/2001 |
| JP | 2003-509982 A | 3/2003 |
| WO | 01/20942 | 3/2001 |
| WO | WO 2008/129660 A1 | 10/2008 |
| WO | WO 2010/117998 A2 | 10/2010 |
| WO | WO 2011/018033 A1 | 2/2011 |
| WO | WO2011134099 | * 11/2011 |
| WO | WO 2011134099 A1 | * 11/2011 |

OTHER PUBLICATIONS

Federal Communications Commission, In the Matter of Unlicensed Operation in the TV Broadcast Bands (ET Docket No. 04-186) Additional Spectrum for Unlicensed Devices Below 900 MHz and in the 3GHz Band (ET Docket No. 02-380, FCC 08-260, Second Report and Order and Memorandum Opinion and Order (Nov. 2008).

Federal Communications Commission, In the Matter of Unlicensed Operation in the TV Broadcast Bands (ET Docket No. 04-186) Additional Spectrum for Unlicensed Devices Below 900 MHz and in the 3GHz Band (ET Docket No. 02-380, FCC 10-174, Second Memorandum Opinion and Order (Sep. 2010).

Mueck et al., "TV White Space Standardization and Regulation in Europe," International Conference on Wireless Communication, Vehicular Technology, Information Theory and Aerospace and Electronic Systems Technology, pp. 1-5 (Feb. 2011).

Reconfigurable Radio Systems (RRS); Use cases for Operation in White Space Frequency Bands, Draft ETSI TR 102 907 V0.0.9 (Jan. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.6.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.6.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.0.0 (Dec. 2011).

Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.9.0 (Sep. 2010).

Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.10.0 (Jun. 2010).

Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.5.0 (Dec. 2010).

Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.9.0 (Dec. 2011).

Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.0.0 (Dec. 2010).

Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.4.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.12.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.5.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.9.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.0.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.4.0 (Dec. 2010).

3rd Generation Partnership Project (3GPP), TS 36.300 V10.1.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", Sep. 2010, pp. 1-192.

3rd Generation Partnership Project (3GPP), TS 36.304 V9.4.0, "Technical Specification Group Radio Access Network, Evolved Universal Terrestrial Radio Access (E-UTRA), User Equipment (UE) Procedures in Idle Mode (Release 9)", Sep. 2010, pp. 1-32.

3rd Generation Partnership Project (3GPP), TS 36.331 V9.4.0, "Technical Specification Group Radio Access Network, Evolved Universal Terrestrial Radio Access (E-UTRA), Radio Resource Control (RRC), Protocol Specification (Release 9)", Sep. 2010, pp. 1-252.

European Telecommunications Standards Institute (ETSI), RP-100601, "ETSI Reconfigurable Radio System (RRS)—Status

(56) References Cited

OTHER PUBLICATIONS and Relevance to 3GPP RAN", 3GPPRAN#48-RAN Plenary Meeting, Korea, Jun. 1-4, 2010, pp. 1-13.

* cited by examiner

METHOD AND APPARATUS FOR COORDINATING CHANGE OF OPERATING FREQUENCY

CROSS REFERENCE TO RELATED APPLICATIONS

This application claims the benefit of U.S. Provisional Application No. 61/447,512, filed on Feb. 28, 2011, and PCT application No. PCT/US2012/026749, filed Feb. 27, 2012, the contents of which are hereby incorporated by reference herein.

BACKGROUND

The Federal Communications Commission (FCC) seeks to prevent or reduce interference among radio transmitters by licensing specific frequency bands for use by specific types of radio transmitters. The FCC has licensed the television (TV) band (corresponding to channels 2 through 51) primarily for use for TV transmissions. The FCC has also licensed certain TV band channels for use by other types of radio transmitters. For example, channel 37 is reserved for radio astronomy, channels 7 through 46 are licensed for further use by Wireless Medical Telemetry Service (WMTS), channels 14 through 20 are licensed for further use by the Private Land Mobile Radio System (PLMRS), channels 4-36 and 38-51 are licensed for further use by remote control devices, and channels 2 through 51 are licensed for further use by wireless microphones.

Subject to certain conditions targeted toward reducing the risk of interference between licensed and unlicensed radio transmitters operating in the TV band, the FCC also allows unlicensed radio transmitters to operate on frequencies in the TV band that are allocated to broadcasting services but are not used locally. These frequencies may be referred to herein as the TV white space (TVWS) and include, for example, frequencies corresponding to channels 2-36 and 38-51.

SUMMARY

Methods and apparatus are described. According to a method, a wireless transmit/receive unit (WTRU) communicates with a base station using a first base station operating frequency and a set of cell configuration parameters. The WTRU receives information indicating a second base station operating frequency to use for communications with the base station at a given time. The WTRU communicates with the base station using the second base station operating frequency and the same set of cell configuration parameters on or after the given time.

BRIEF DESCRIPTION OF THE DRAWINGS

A more detailed understanding may be had from the following description, given by way of example in conjunction with the accompanying drawings wherein.

DETAILED DESCRIPTION

Figure 1A:
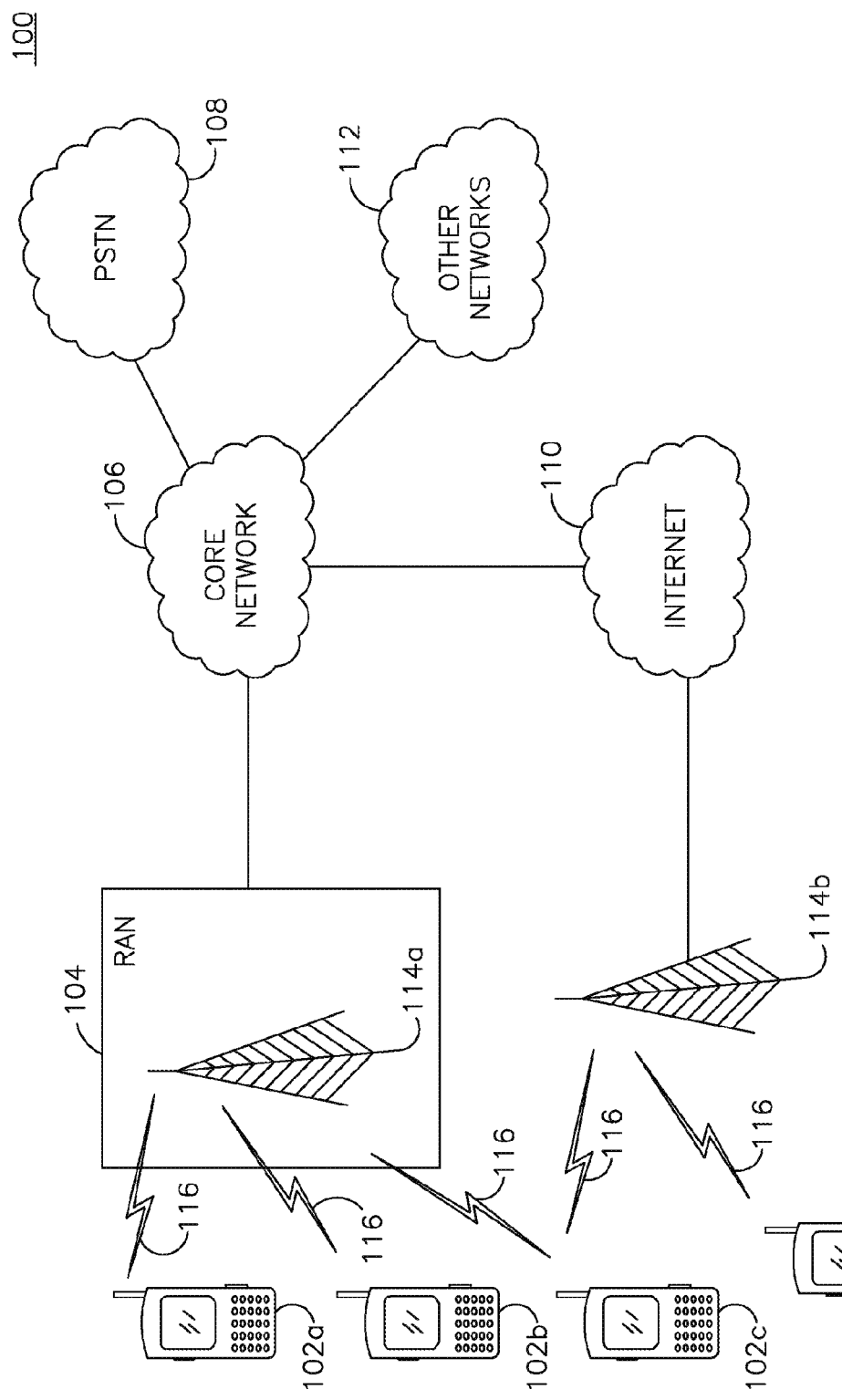
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
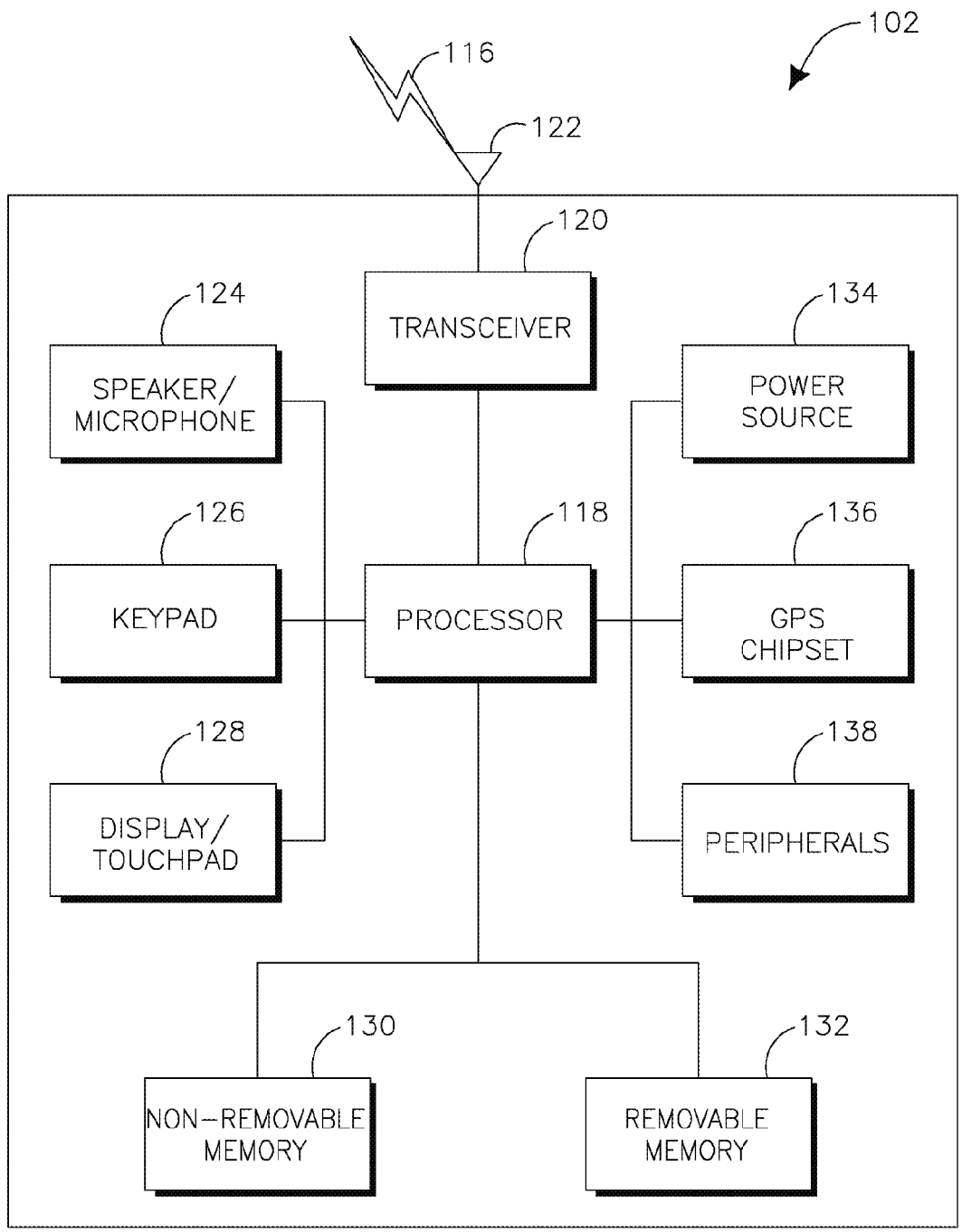
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
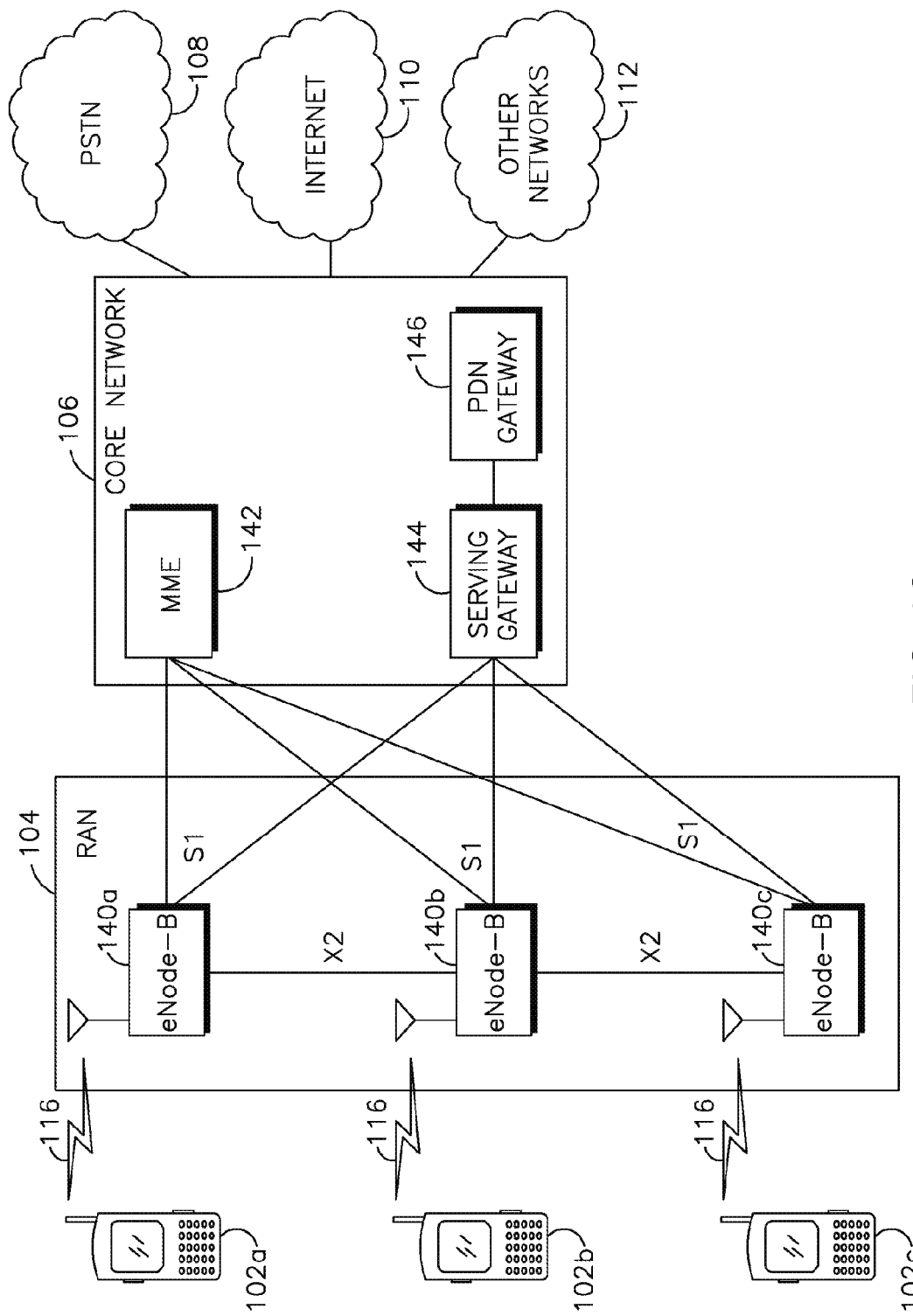
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the 51 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A WTRU may conduct communications with a base station using the base station's operating frequency. A WTRU may be informed about the operating frequencies of base stations in a network via a system information acquisition procedure, which may include broadcasting the operating frequencies to WTRUs in the network in the system information (SI) if the network operator has a priori knowledge of the operating frequencies of the base stations in the network. In an LTE system, the SI may be broadcast periodically via a MasterInformationBlock (MIB) and a number of SystemInformationBlocks (SIBs). Specific SIBs may be used to broadcast serving-cell and neighbor-cell information (e.g., cell identity, operating frequency, etc.).

Figure 2:
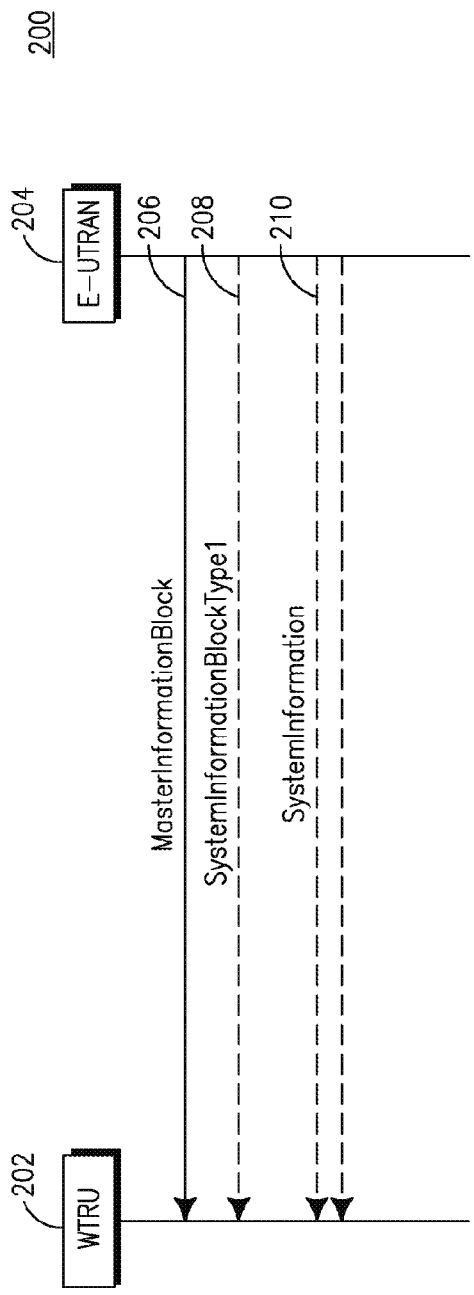
FIG. 2 is a diagram illustrating an example system information acquisition procedure for a network where an operator has a priori knowledge of the operating frequencies of the base station in the network.

FIG. 2 is a diagram 200 illustrating an example SI acquisition procedure for a network in which the network operator has a priori knowledge of the operating frequencies of the base stations in the network. In the illustrated example, a network air interface such as an Evolved Universal Terrestrial Radio Access Network (E-UTRAN) 204 transmits SI 210 to a WTRU 202 via SIBs 208 (e.g., SystemInformationBlockType1) and a master information block (MIB) 206.

It may be necessary to update the SI from time to time if, for example, any of the information changes. If the SI changes, WTRUs may be notified about the changes via an SI update procedure.

Figure 3:
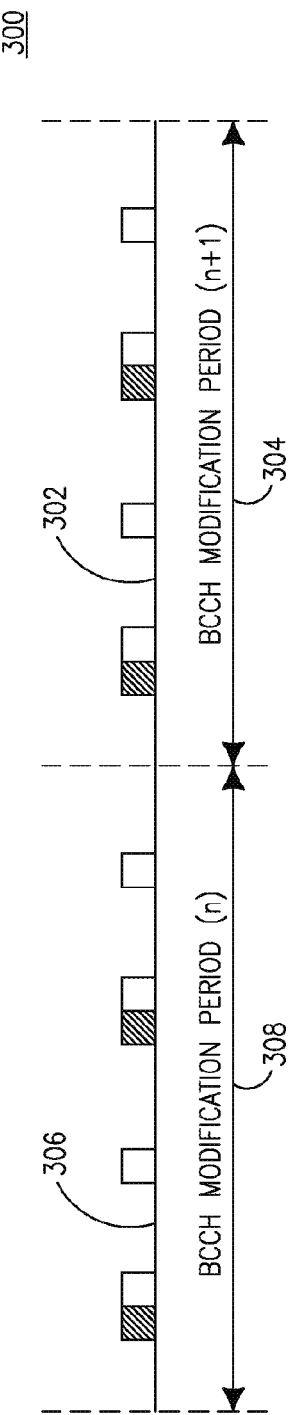
FIG. 3 is a diagram 300 illustrating an example system information update procedure.

FIG. 3 is a diagram 300 illustrating an example SI update procedure. When the network changes its SI, it may first notify the WTRUs about the change, for example, by transmitting a change notification 306 to the WTRUs during a broadcast common control channel (BCCH) modification period 308. In a next modification period 304, the network may transmit the updated SI 302. SI messages may be transmitted a number of times with the same content within a modification period, as defined by its scheduling. A paging message may also be used to inform WTRUs in RRC_IDLE and RRC_CONNECTED modes that the SI will be changed during the next modification period. If the WTRU receives a paging message including the element systemInfoModification, the WTRU may know that the SI will change at the next modification period boundary. Although the WTRU may be informed about changes in the SI during the modification period 308, further details (e.g., regarding which system information will change) may not be provided during the modification period 308.

A WTRU may switch cells from time to time (e.g., if the WTRU is experiencing a high level of interference in its current cell). A WTRU in an RRC_IDLE mode may switch to a new cell, for example, by performing cell reselection. In performing cell reselection, the idle mode WTRU may measure attributes of the current serving and neighbor cells to identify a cell that the WTRU should camp on.

In an embodiment, inter-frequency reselection may be based on absolute priorities in which a WTRU may try to camp on a highest priority frequency available. The absolute priorities of different E-UTRAN frequencies may be provided to the WTRU in the SI via an RRCConnectionRelease message or SIBs. If, however, priorities are provided in dedicated signaling, the WTRU may ignore all the priories provided in the SI.

In an embodiment, reselection to a new cell based on priority may be triggered using a SystemInformationBlockType3. For example, if a threshServingLowQ element is provided in a SystemInformationBlockType3, the WTRU may perform cell reselection to a cell on a higher priority E-UTRAN frequency than the serving frequency if a cell of a higher priority E-UTRAN frequency fulfils a cell selection quality value (Squal) or a cell selection RX level value (Srxlev) is above certain threshold during a time interval and more than 1 second has elapsed since the WTRU camped on the current serving cell.

For another example, if a threshServingLowQ element is provided in SystemInformationBlockType3, the WTRU may perform cell reselection to a cell on a lower priority E-UTRAN frequency than the serving frequency if the serving cell fulfils Squal or Srxlev is below a certain threshold, a cell of a lower priority E-UTRAN frequency fulfils Squal or Srxlev is above certain threshold during a time interval, and more than 1 second has elapsed since the WTRU camped on the current serving cell.

For another example, a WTRU may perform cell reselection to a cell on an equal priority E-UTRAN frequency (e.g., equal to the priority of the serving cell frequency) if the cell on the equal priority E-UTRAN frequency satisfies cell selection criterion (S), is better ranked than the serving cell during a time interval, and more than 1 second has elapsed since the WTRU camped on the current serving cell. The priority ranking of a cell may be based on cell-ranking criterion (Rs and Rn), which may be based on reference signal received power (RSRP) measurements. The time interval described above may be scaled due to the WTRU's mobility state.

A WTRU in an RRC_CONNECTED mode may switch to a new cell, for example, by performing a handover (HO) process. In an LTE HO process, a connected mode WTRU may be actively communicating with an eNB to transmit and receive user data. In this situation, the eNB may control and configure cell search and measurement activity. WTRU neighbor-cell performance monitoring may be given high priority so as to ensure the maintenance of the radio link.

When a better serving cell than the current one has been identified, the eNB may trigger a WTRU to handover to another cell using one of several HO types including, for example, intra-frequency handover, inter-frequency handover and inter-RAT handover. In intra-frequency handover, the source cell and the target cell may operate on the same LTE carrier. In inter-frequency handover, the source cell and the target cell may operate on different LTE carriers. In inter-RAT handover, the source cell and the target cell may be deployed with a different RAT.

Figure 4:
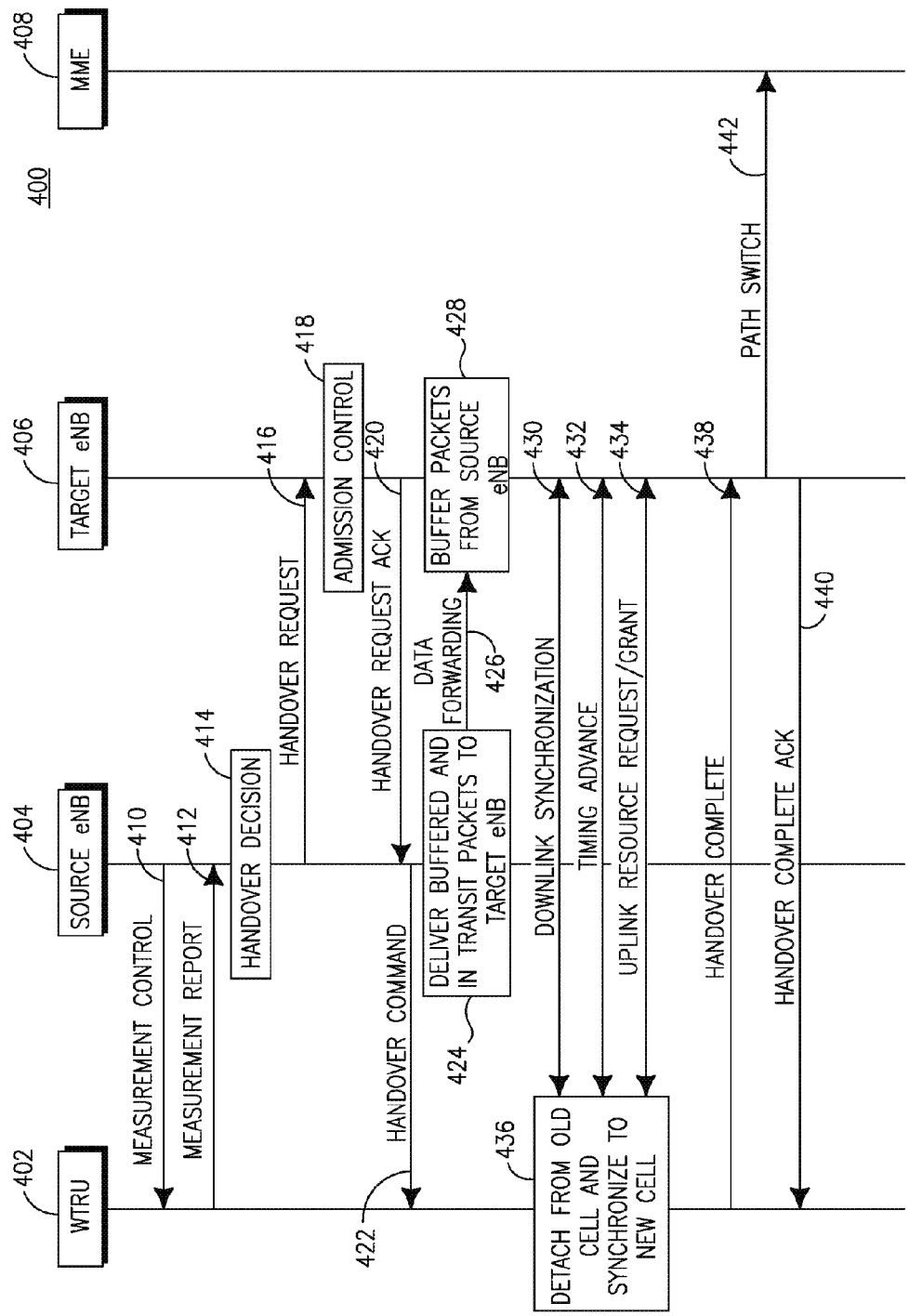
FIG. 4 is a signal diagram illustrating an intra-MME handover procedure for WTRUs in an RRC_CONNECTED mode.

FIG. 4 is a signal diagram 400 illustrating an intra-Mobility Management Entity (MME) handover procedure for WTRUs in an RRC_CONNECTED mode. In the illustrated example, a source eNB 404 configures WTRU measurement procedures. To do so, the source eNB 404 may transmit a measurement control message 410 to the WTRU 402. In response to receiving the measurement control message 410, a WTRU 402 may generate and transmit a measurement report 412 to the source eNB 404.

Based at least on the measurement report 412, the source eNB 404 may decide that an HO is necessary (414), identify a suitable target eNB 406 and send a handover request 416 to the target eNB 406. The target eNB 406 may accept the handover request (418) and provide the source eNB 404 with parameters for the WTRU 402 to access the target cell 406 once the HO has been executed in a handover request acknowledgement (ACK) 420. The parameters may include, for example, a cell ID, a carrier frequency and allocated uplink and downlink resources.

The source eNB 404 may send a handover command 422 to the WTRU 402. In response to receiving the handover command 422, the WTRU 402 may interpret the radio link with the source eNB 404 and initiate establishment of the new radio link with the target eNB 406 (436). In initiating establishment of the new radio link with the target eNB 406, the source eNB 404 and the target eNB 406 may engage in downlink synchronization establishment (430), timing advance (432) and uplink resource allocation (434). In the meantime, the source eNB 404 may forward the WTRU data to the target eNB 406 (424 and 426), and the target eNB 406 may buffer packets received from the source eNB 404 (428).

When uplink activity has been established with the target eNB 406, the WTRU may send an HO complete message 438 to the target eNB 406 to notify it that handover has been completed. The target eNB 406 may notify an MME 408 that the HO is successful, the MME 408 may reroute downlink data to the target eNB 406 (442), and the target eNB 406 may acknowledge the handover (440).

In cellular networks with base stations operating only on radio frequencies licensed for their use, the frequency of operation of each base station in the cellular network may be carefully selected to determine an optimal configuration that provides adequate coverage and capacity while minimizing the effects of inter-cell interference. At least because of the careful planning that is undertaken to select base station operating frequencies in these cellular networks, the base station frequencies remain fixed (or are changed very infrequently) once they are selected.

For cellular networks wherein one or more base stations and WTRUs are configured to operate in one or more bands that are not specifically licensed for their use (e.g., the TVWS band), base stations may need to switch their operating frequencies in real time or as close to real time as possible for a number of different reasons. For example, bands such as the TVWS may be subject to stronger interference than licensed bands. This may be due to, for example, a high powered broadcast digital TV signal in an adjacent channel leaking into the previously selected base station operating channel, presence of an uncoordinated narrowband man-made interferer on the previously selected base station operating channel, or presence of a wireless microphone that is not occupying the entire channel. For another example, a cell operating in the TVWS band may be less reliable than a cell operating in a licensed band because primary (licensed) spectrum users have priority over the channel. For another example, a cell operating in the TVWS may be subject to more interference due to the presence of other secondary users and man-made noise. Accordingly, the secondary user may have to frequently stop operating on a given channel due to arrival of a primary user and/or a high level of interference with other secondary users.

Base stations operating in bands that are licensed for their use may also be subject to conditions (e.g., interference from other band users) in which it may be optimal for a base station to dynamically change its operating frequency. Accordingly, while embodiments are described herein with respect to base stations and WTRUs operating in unlicensed bands, the embodiments are also applicable to base stations and WTRUs operating in licensed bands.

Cellular networks, such as long term evolution (LTE) networks, were originally intended to use operating frequencies that are licensed for their use. Accordingly, mechanisms were not originally put in place that would have allowed base stations (e.g., eNBs) to rapidly and dynamically reconfigure themselves to operate in a new channel or cell and to notify the WTRUs and the network when such a reconfiguration occurs. Embodiments described herein provide methods and apparatus that may coordinate reconfiguration of a base station to operate in a new channel or cell (e.g., for an LTE system operating in the TVWS) using methods such as, for example, cell reconfiguration, directed cell change and a virtual multi component carrier (CC) cell, to facilitate, for example, a robust mechanism that may be used to coordinate a base station cell reconfiguration. An enhanced base station architecture that may include capabilities that may enable the operation of cellular long term evolution (LTE) technology in an emerging spectrum such as the TVWS is also described.

Mechanisms that may be used to notify the WTRUs of an impending channel change are also described herein. In an embodiment, information elements (IEs) are defined that may be included in the broadcast system information (SI) and used for coordination of a cell reconfiguration. In another embodiment, TVWS candidate lists and a serving-cell reconfiguration time may be distributed via the Multimedia Broadcast Multicast Service (MBMS). In another embodiment, a multicast addressing mechanism is described that may make use of a multicast RNTI (MC-RNTI) that may reduce signaling overhead needed for coordination of a cell reconfiguration.

Methods for coordinating a cell reconfiguration between a base station and the WTRUs it is serving are also described herein. In an embodiment, a method to reconfigure a cell to operate using a new frequency and cell ID is described. In another embodiment, a directed cell change method may be used to redirect WTRUs being served by a cell that is required to stop transmission (e.g., due to a change in channel availability and/or quality) to a new cell. In another embodiment, the concept of a Virtual Multi Component Carrier (CC) cell may be extended. Here, the Virtual Multi CC cell may be associated with a set of cell configuration parameters including at least one unique cell configuration parameter such as a unique cell ID that is known by the WTRUs being serviced by the cell and may be quickly swapped in or out as the active configuration for the cell.

Adaptations to the idle mode procedures for the TVWS are also described herein. In an embodiment, a method is described that may adaptively change the SI modification period to, for example, decrease switching latency when making use of the SI and the SI acquisition procedure for coordination of a cell reconfiguration. In another embodiment, a method is described that may adaptively change the cell reselection priority parameters to trigger WTRUs in the RRC_IDLE mode to perform cell reselection to another suitable cell when it is determined that a cell reconfiguration is required.

Adaptations to the handover procedure for the TVWS are also described. In an embodiment, a method of triggering and coordinating a cell reconfiguration based on WTRU measurement reports by WTRUs in RRC_CONNECTED mode are described.

Some of the embodiments described herein are described and illustrated with respect to an LTE system operating in the TVWS. However, one of ordinary skill in the art will recognize that any of the embodiments described herein may be applied to other wireless technologies (e.g., UMTS) operating in any licensed exempt (LE) band (e.g., TVWS, ISM etc.).

Figure 5A:
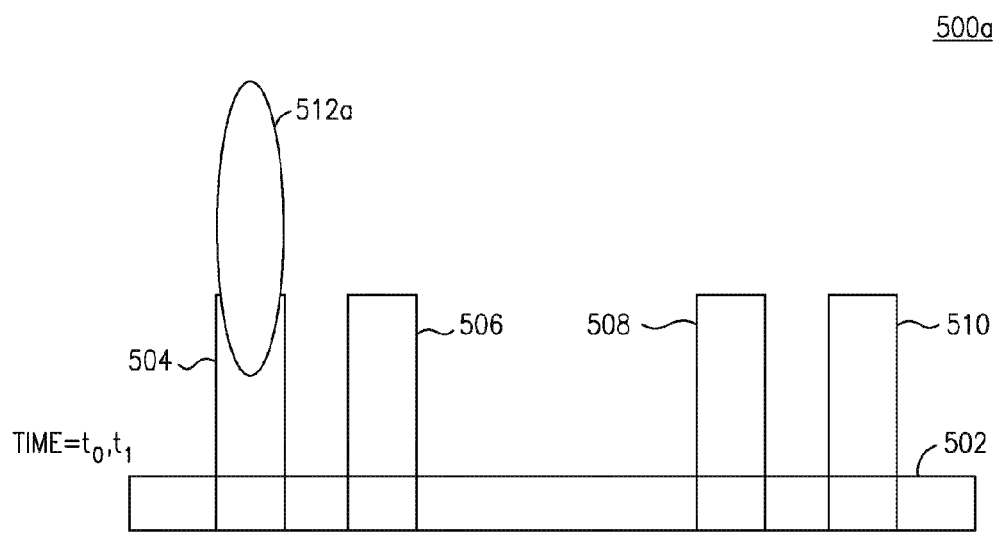
FIGS. 5A and 5B are diagrams illustrating an embodiment of cell reconfiguration.
Figure 5B:
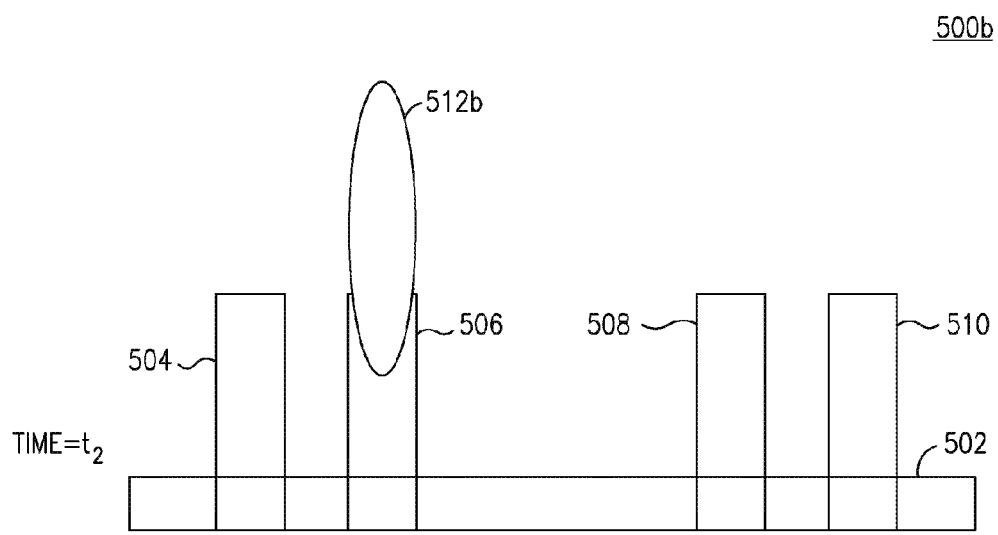

FIGS. 5A and 5B are diagrams illustrating an embodiment of cell reconfiguration. Diagrams 500a and 500b each illustrate a cell 512 operating at different points in time in a band 502 that it is not specifically licensed to use (e.g., the TVWS band). The band 502 may include channels 504, 506, 508 and 510.

In diagram 500a of FIG. 5A, at a first time to, a base station (e.g., an eNB) may operate the cell 512a on channel 504 (corresponding to, for example, a frequency y) in the band 502 using a cell ID z. At a second time $t_1$, the base station may detect that it must evacuate the channel 504 in frequency y (e.g., due to detected interference with a primary or secondary user) and may inform idle mode and connected mode WTRUs operating under the impacted cell that a cell reconfiguration will occur at a third time $t_2$. The base station may also inform neighboring cells of the reconfiguration.

In diagram 500b of FIG. 5B, at the third time $t_2$, the base station may stop transmitting on the channel 504 associated with the frequency y and begin transmitting on a new frequency (e.g., frequency z) corresponding to the channel 506. The same cell ID z may be used to operate the cell 512b on the new channel 506. Thus, in this embodiment, the base station may continue operating the same cell but on a different frequency. In an embodiment, the same set of cell configuration parameters including the same cell ID may be used for communications on frequency y and frequency z. Configuration parameters that may be included in the set of cell configuration parameters may include radio resource information elements (IEs) included in the RadioResourceConfigCommon IE and/or the RadioResourceConfigDedicated IE.

Figure 6A:
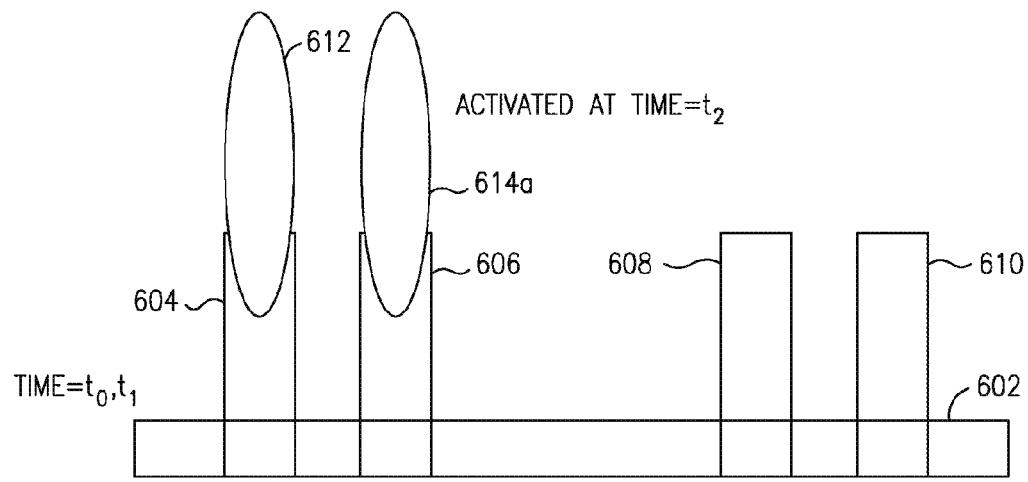
FIGS. 6A and 6B are diagrams illustrating an embodiment of directed cell change.
Figure 6B:
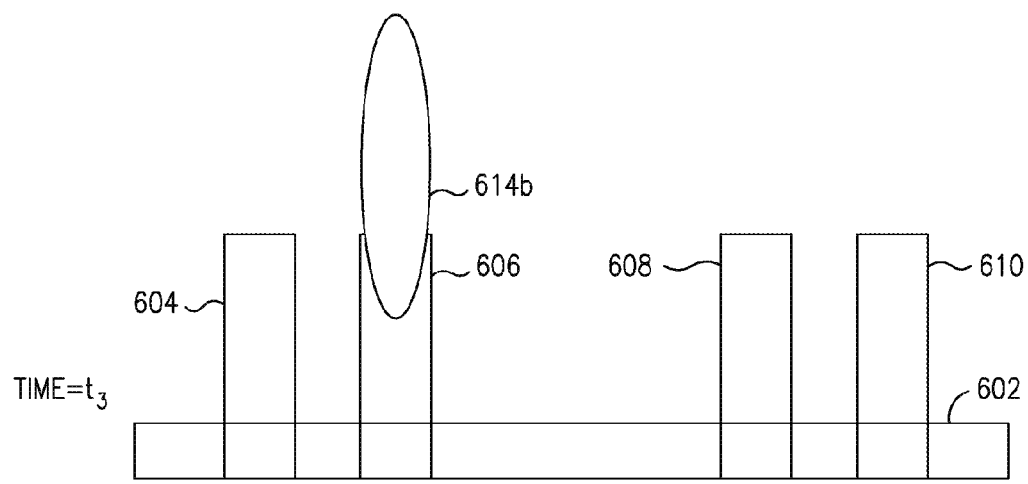

FIGS. 6A and 6B are diagrams illustrating an embodiment of directed cell change. In diagram 600a of FIG. 6A, at a first time $t_0$, a base station (e.g., an eNB) may operate a cell 612 on a channel 604 (corresponding to, for example, a frequency y) of a plurality of channels 604, 606, 608 and 610 in a band 602 using a set of cell configuration parameters and a first cell ID. Configuration parameters that may be included in the set of cell configuration parameters may include radio resource information elements (IEs) included in the RadioResourceConfigCommon IE and/or the RadioResourceConfigDedicated IE.

At a second time $t_1$, the base station may detect that it must evacuate the channel 604 in frequency y (e.g., due to detected interference with a primary or secondary user) and may set up a new cell 614a on channel 606 (corresponding to, for example, a frequency z) using a second cell ID and the same set of cell configuration parameters at a third time $t_2$. Starting at time $t_2$, the base station may inform idle mode WTRUs that are using the impacted cell 612 to initiate a directed cell reselection to the new cell 614. The WTRUs may reselect the new cell using a cell reselection procedure such as the LTE cell reselection procedure described above. Such procedure may be streamlined, if desired, for example, by eliminating some of the cell reselection measurements or avoiding a complete SIB read of the new cell.

Starting at time $t_2$, the base station may also inform WTRUs in connected mode to initiate an HO to the new cell 614b, for example, using a synchronized handover or other methods such as the methods described above with respect to FIG. 4. As illustrated in diagram 600b of FIG. 6B, for example, at a fourth time $t_3$, the base station may stop operation of the impacted cell 612. The base station may also inform neighboring cells of the reconfiguration.

Figure 7A:
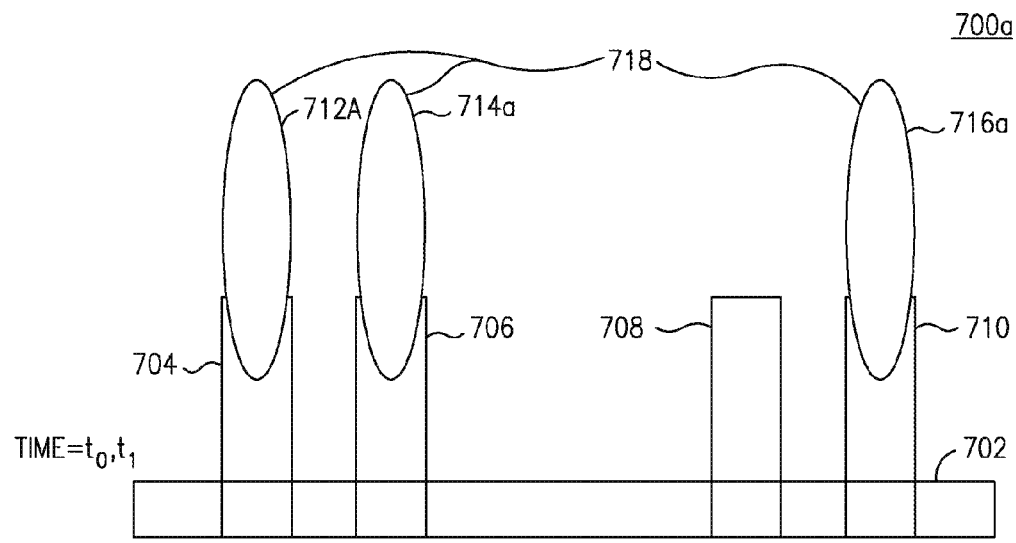
FIGS. 7A and 7B are diagrams illustrating an embodiment of a virtual multi component carrier (CC) cell.
Figure 7B:
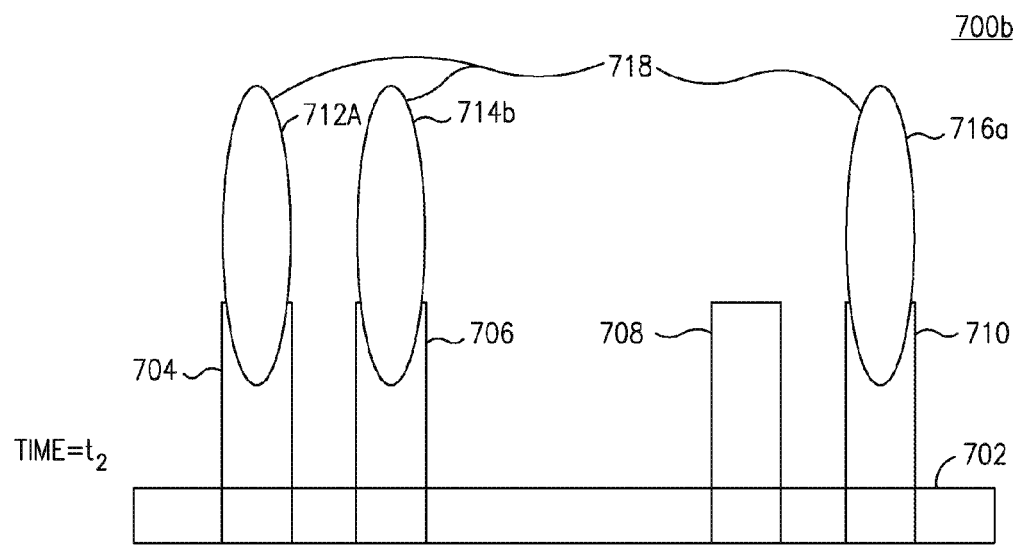

FIGS. 7A and 7B are diagrams illustrating an embodiment of a virtual multi component carrier (CC) cell 718. The virtual multi CC cell 718 may include, for example, a set of cells 712, 714 and 716 that are controlled by a single eNB operating over different channels (e.g., channels 704, 706 and 710 of channels 704, 706, 708 and 710 belonging to band 702). Less than all of the cells 712, 714 and 716 may be active at a given time to serve both connected mode and idle mode WTRUs. The other cells may remain dormant or deactivated. Configuration parameters for each of the cells 712, 714 and 716, including a set of cell configuration parameters that may be the same for each of the cells and at least one unique cell configuration parameter including a different cell ID for each of the cells, may be set independently and may be known in advance by all WTRUs served by the virtual multi CC cell 718. Configuration parameters that may be included in the set of cell configuration parameters may include radio resource information elements (IEs) included in the RadioResourceConfigCommon IE and/or the RadioResourceConfigDedicated IE.

In the example illustrated in FIG. 7A, at a first time to, an eNB operates the virtual multi CC cell 718 in diagram 700a in which the cell 712a, which may have a first operating frequency Y and a first cell ID u, is active while cells 714a and 716a, which may have different operating frequencies and cell IDs, are dormant. At a second time $t_1$, the eNB may detect that it must evacuate the channel 704 on which it is operating the currently active cell 712a. Starting at the second time $t_1$, the eNB may inform idle mode and connected mode WTRUs that another cell (e.g., cell 714a) of the set 718 will be activated and the currently active cell 712a will go dormant at a third time $t_2$. At the third time $t_2$, as illustrated in diagram 700b of FIG. 7B, for example, the eNB may deactivate the previously active cell 712b and activate one of the cells that was previously dormant but pre-configured (e.g., 714b or 716b).

The examples of cell reselection, directed cell change and virtual multi CC cell described above with respect to FIGS. 5-7 may enable base stations to rapidly switch frequencies when it is determined that a change in the base station's operating frequency may be necessary. Methods are described below with respect to FIGS. 8, 9 and 10 that may enable more efficient coordination of such frequency changes, including, for example, rapid determination that a frequency change is needed and rapid notification to both idle and connected mode WTRUs that such a change is impending.

In an embodiment, a base station may notify both idle and connected mode WTRUs of an impending change of operating frequency using a message (e.g., a multicast message)

that the base station may send to all WTRUs it is serving. One of ordinary skill in the art will recognize that dedicated messages may also be used to notify the WTRUs of an impending change of operating frequency. In one embodiment, information relevant to a cell reconfiguration may also be included in the multicast message. In another embodiment, the multicast message may only notify the WTRUS that a cell reconfiguration is impending, and the WTRUs being served by the base station may use an SI acquisition procedure (such as the procedure illustrated in FIG. 2) to acquire the information pertaining to the cell reconfiguration upon receipt of the multicast message. For idle mode WTRUs, the multicast message may be communicated, for example, using the Paging Control Channel (PCCH). For connected mode WTRUs, the multicast message may be communicated, for example, using a Signaling Radio Bearer (SRB).

WTRUs in an RRC_IDLE state (also referred to herein as idle mode WTRUs) are in a low activity state in which the WTRU sleeps most of the time to reduce battery consumption, and, as such, idle mode WTRUs may not maintain uplink synchronization with the base station. However, in the downlink, an idle mode WTRU may periodically wake up in order to be paged for incoming calls and may also be required to wake up to take measurements to evaluate serving cell and neighbor cell quality (such as measurements of reference signal received power (RSRP) and reference signal received quality (RSRQ). In particular, an idle mode WTRU may be required to evaluate cell selection criteria for a server cell at least once very discontinuous (DRX) cycle.

In an embodiment of frequency change coordination for an idle mode WTRU, idle mode WTRUs may be notified that an E-UTRAN operated solely in TVWS is going to change frequencies by individually changing to the RRC_CONNECTED mode and then switching back to the idle mode after changing the serving-cell channel. This approach may minimize channel switching delays for idle mode WTRUs but may also lead to signaling overhead if a high volume of idle mode WTRUs are present as well as WTRU higher power consumption. Other embodiments of frequency change coordination for idle mode WTRUs are described below, for example, with respect to FIGS. 8 and 9, that may minimize required signaling overhead and power consumption and provide low latency channel switching with minimum overhead cost (e.g., for base stations that operate exclusively in frequency bands).

In one embodiment, the DRX cycle or modification period may be modified (e.g., decreased), which may decrease the channel switching latency of idle mode WTRUs by triggering them to read the SI more frequently (thereby, for example, notifying them of an impending channel change faster than for a traditional modification period). Changing the modification period may be accomplished, for example, by changing the modificationPeriodCoeff element and/or defaultPagingCycle element. The eNB may inform multiple idle mode WTRUs about the system information change, for example, using a paging message.

Figure 8:
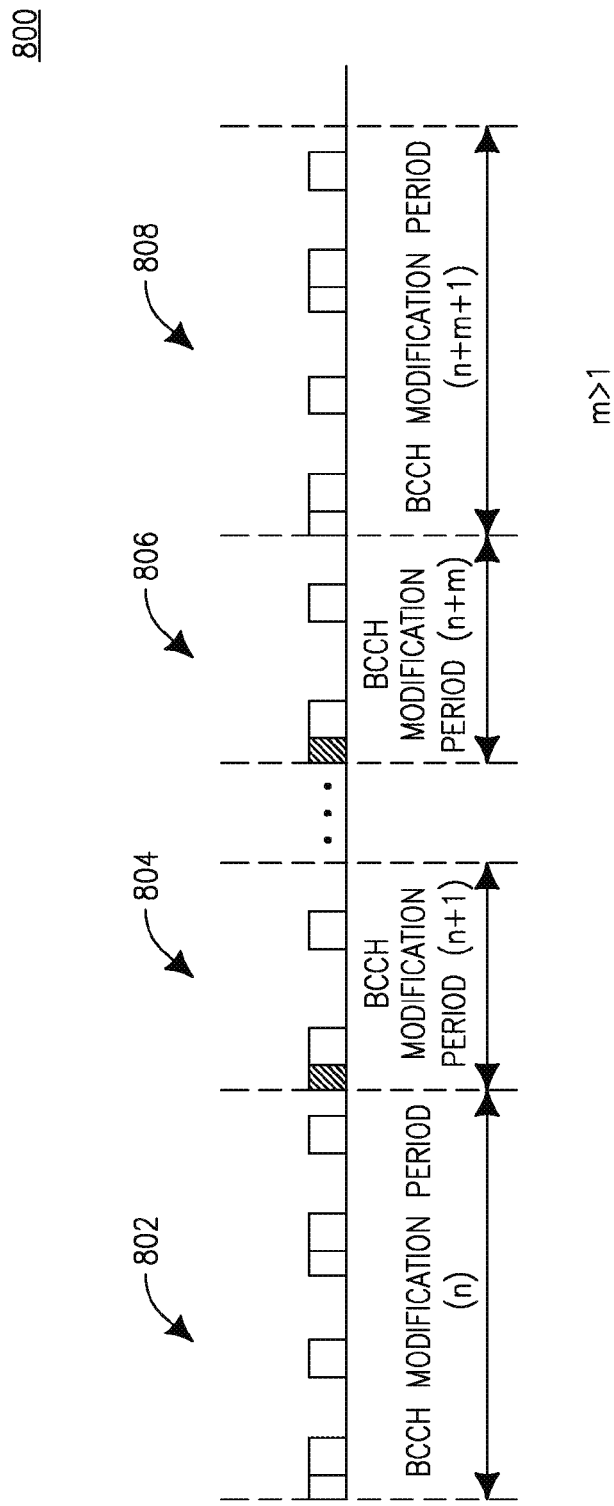
FIG. 8 is a diagram of an example method of adaptive modification period changing based on network status.

FIG. 8 is a diagram 800 of an example method of adaptive modification period changing based on network status. In the illustrated example, when a base station (e.g., an eNB) detects that there is a high probability that the current channel(s) (e.g., TVWS channel(s)) need to be changed (e.g., the channel quality of the current TVWS channel is lower than a specified value but within working range), the base station may inform the WTRUs that a system information change is impending by including a systemInfoModification element in the paging message during a BCCH modification period 802. The WTRUs may acquire the new system information, and the base station may include new DRX cycle or new modification period coefficients (e.g., reduced defaultPagingCycle or smaller modificationPeriodCoeff) in a next modification period. After acquiring the new system information, the WTRUs may apply the updated system information (e.g., shorter DRX cycle or smaller modification period coefficient) during a next BCCH modification period 804. Once the shorter modification period or DRX cycle is in effect, if the base station determines that cell reconfiguration is required, the base station may include the systemInfoModification element in the paging message and WTRUs may acquire the system information from the base station again during the BCCH modification period 806. Alternatively, new TVWS channel(s) may be indicated in the field freqBandIndicator included in a SystemInformationBlockType1, which may be broadcast by a base station during the modification period 808. Once a WTRU moves to the new TVWS channel(s), it may return to the original modification period or DRX cycle. If the channel condition improves and the base station determines that no cell reconfiguration required, the base station may notify the WTRUs about the system information change and the original modification period may be resumed.

In another embodiment, a notification of an impending frequency change may be embedded in the SI without changing the DRX cycle, saving power consumption in the channel switch. Here, a channel candidate list may be included in the SIB by setting the field cellReselectionPriority according to the latest channel usage status.

If the serving base station knows it will release the current operational channel soon (e.g., due to various factors determined, for example, by checking the TVWS database, spectrum sensing, etc.), the serving base station may set the priority level of the current channel to be the lowest and set the priority levels of the candidate channels to be high. The candidate channels (e.g., the channels to which the base station will probably switch) may be determined by the base station based on the channel conditions. Once an idle mode WTRU wakes up after its serving cell has changed its operating channel, it may detect that its serving cell's Squal and/or Srelev is below a specified threshold. It may then measure channels in the order of priority levels according to its stored system information. This priority information may facilitate a cell reselection procedure, as it may avoid the need for the WTRU to measure certain channels that may be unlikely to become the new operational channel.

If the serving base station knows it will not release the current operational channel in a short time period, it may set the priority level of the current channel to be the highest to, for example, notify the WTRUs to not prepare for channel changing. In another embodiment, if a base station knows that it needs to change the operating channel, it may broadcast the new channel information in the SI. This information may include the new operating channel and the time at which the base station will switch to the new operating channel (e.g., specified in terms of K frames or N modification periods).

In an embodiment, a base station may trigger an idle mode WTRU to read the new SI using a paging message that includes the information element (IE) systemInfoModification. In another embodiment, a base station may trigger an idle mode WTRU to read the new SI using a paging message with a new channelchange-Indication IE, for example, to inform the WTRU to immediately read the SI related to cell reconfiguration and not wait for the start of the next modification period. In another embodiment, the a base station may trigger an idle mode WTRU to read the new SI using a PDCCH message destined to a channel-change specific radio network temporary identifier (cc-RNTI). Upon receiving this message, the WTRU may begin reading the SI to determine the new operating channel information. In any of these embodiments, the WTRU may wait until the end of its DRX period to obtain the indication to read the SI. In another embodiment, the indication may be provided through physical layer signaling.

Figure 9:
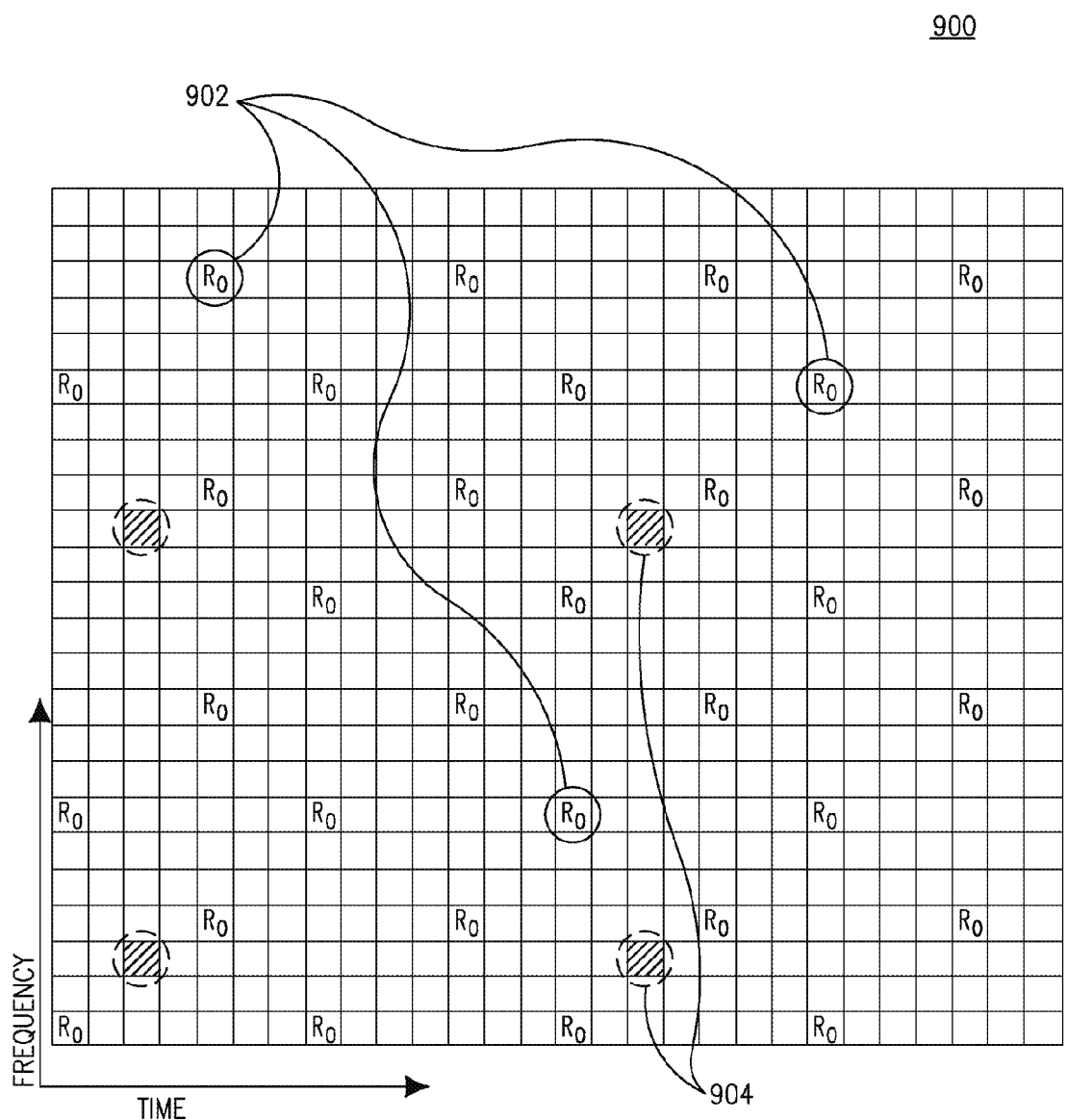
FIG. 9 is a diagram illustrating an example of a physical layer cell reconfiguration indication.

FIG. 9 is a diagram 900 illustrating an example of a physical layer cell reconfiguration indication. In one embodiment, the WTRU may rely on specific patterns in cell-specific downlink reference signals to trigger an end to the DRX period and a reading of the SI to determine a potential new operating channel. In another embodiment, the base station may refrain from transmitting certain cell specific reference signal resource elements. This example is illustrated by resource elements 902 in FIG. 9. The observation of this pattern may trigger a reading of the cell reconfiguration SI. This may also trigger the WTRU to come out of the DRX cycle and start monitoring the PDCCH for a cell reconfiguration indication. In an embodiment, the network may reserve a set of resource elements 904 to signal a change of channel, for example, by defining a new set of cell specific reference signals devoted for this purpose.

In another embodiment, a multimedia broadcast multicast service (MBMS) may be used to distribute the TVWS candidate list and a serving-cell reconfiguration time. In LTE, a WTRU in an idle mode interested in receiving MBMS services may apply a multicast control channel (MCCH) acquisition procedure to receive MCCH information upon entering a corresponding MBMS over a Single Frequency Network (MBSFN) area and upon receiving a notification that the MCCH information has changed. In one embodiment, the TVWS candidate list and channel changing notification may be included in the MCCH. In another embodiment, the TVWS candidate list/new serving cell change and changing time may be included in multicast channel (MCH) scheduling information (MSI), which may be generated by the WTRU, may be provided once at the beginning of the MCH scheduling period and may have higher scheduling priority than the MCCH. The MCH scheduling period may be adapted to the network status in order for the idle mode WTRU to obtain the notification with minimum delay. If the a dynamic system management (DSM) engine (described in more detail below with respect to FIG. 12) predicts that a channel switch may occur in the near future, the MCH scheduling period may be shortened such that the WTRU in the idle mode may obtain the channel notification earlier.

In contrast to idle mode WTRUs, WTRUs in an RRC_CONNECTED state (also referred to herein as connected mode WTRUs) may be in active communication with the serving base station in both the uplink and downlink. To facilitate a fast and efficient mechanism to coordinate a base station operating frequency change with connected mode WTRUs, a broadcast/multicast messaging capability may be included at the radio resource controller (RRC). Such a capability may allow the RRC to use a single message to inform all connected mode WTRUs of an impending cell reconfiguration. One of ordinary skill in the art will recognize that dedicated RRC signaling may also be used to coordinate a base station operating frequency change with connected mode WTRUs.

In an embodiment, multiple multicast messages, each addressing a different set of WTRUs, may be used to notify the connected mode WTRUs of an impending channel change. Which WTRU belongs to which multicast group may be determined as a function of a WTRU-related characteristic, such as device class or quality of service (QoS). This may allow the base station to prioritize the order in which the connected mode WTRUs perform a cell reconfiguration, for example. In an embodiment, groups may receive a multicast message including instructions to perform a cell reconfiguration or a handover in order of their priority. For example, a group having the highest priority may receive a multicast message including instructions to perform a cell reconfiguration or a handover before the other groups receive their multicast messages. In an embodiment, some groups may not receive instructions at all.

In an embodiment, a multicast RNTI (MC-RNTI) may be used to support multicasting of RRC messages. The MC-RNTI, which may be the same for all WTRUs in a given cell, may be signaled to a WTRU in the RRCConnectionSetup message. When coordinating a cell reconfiguration, the base station may use the MC-RNTI as the destination WTRU identity for the RRC message. An existing RRC message, such as the HandoverCommand, may be extended to include cell reconfiguration information and to coordinate the cell reconfiguration. In another embodiment, a new RRC message, e.g. ChannelChangeCommand, may be use for this purpose.

Figure 10:
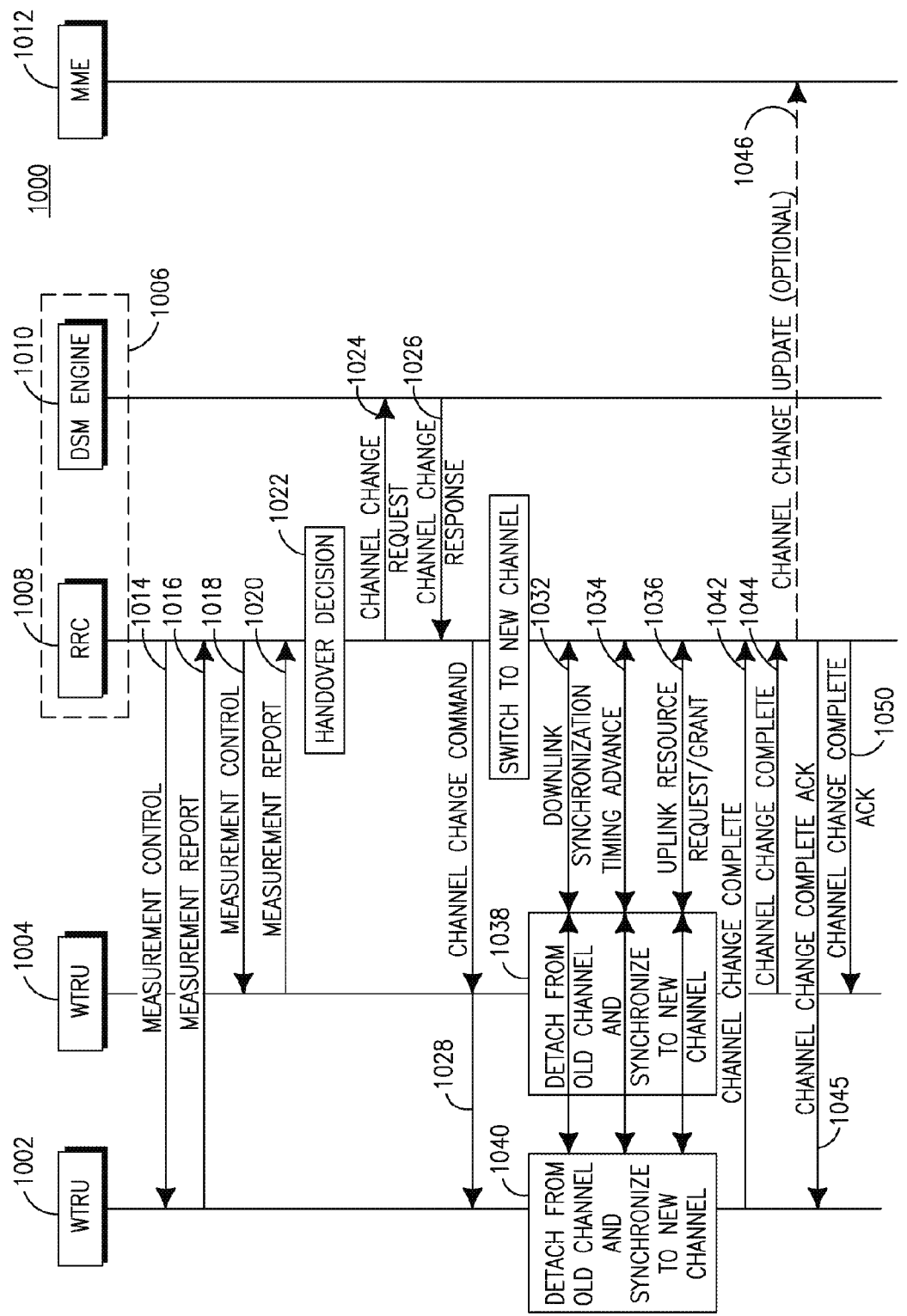
FIG. 10 is a signal diagram illustrating an example channel changing procedure for WTRUs in RRC_CONNECTED mode.

FIG. 10 is a signal diagram 1000 illustrating an example channel changing procedure for connected mode WTRUs. In the illustrated example, it may be assumed that a serving base station (e.g., eNB) 1006 (which may include, for example, an RRC 1008 and a DSM engine 1010) operates on a TVWS channel and two WTRUs 1002 and 1004 are actively served by the base station 1006 (e.g., in RRC_CONNECTED mode). However, embodiments of the channel changing procedure may also apply when more than two WTRUs are actively served. The serving base station may configure WTRU measurement procedures, and the WTRUs may generate and transmit measurement reports to the serving base station.

The serving base station 1006 may send measurement control messages 1014/1018 to the respective WTRUs 1002 and 1004, and, in response to receiving the measurement control messages 1014/1018, the WTRUs 1002 and 1004 may send respective measurement reports 1016/1020 back to the serving base station 1006. Based on the WTRU measurement reports 1016/1020, the serving base station may decide that a TVWS cell reconfiguration is necessary (1022). The measurement reports 1016/1020 may include, for example, information about the TVWS channels other than the active channel, which may be referred to herein as inactive channels. In identifying a suitable target TVWS channel, the RRC 1008 of the serving base station 1006 may resort to the channel control or DSM engine 1010 by providing information about inactive TVWS channels in a channel change request message 1024. The RRC 1008 may obtain the information about the inactive TVWS channels, for example, from the measurements reports 1016/1020. The channel control or DSM engine 1010 may make some calculations, may determine the new TVWS channel and may inform the RRC 1008 about the new TVWS channel via a channel changing response message 1026.

The serving base station 1006 may signal the cell reconfiguration/channel change command 1028 to all connected mode WTRUs (e.g., WTRUs 1002 and 1004) (e.g., using multicast messaging). One of ordinary skill in the art will recognize that dedicated messaging may also be used to signal the reconfiguration/channel change command to the WTRUs. The ChannelChangeCommand message may include the new channel carrier frequency. Once the ChannelChangeCommand message is multicast, the serving base station 1006 may cease operating on the old TVWS channel and begin operating on the new TVWS channel (1030). In another embodiment, a new or enhanced DCI message within a common search space may be defined to inform all WTRUs in the RRC_Connected mode of the impending cell reconfiguration.

Once the WTRUs receive the ChannelChangeCommand message from the serving base station 1006, they may interrupt the radio link on the old TVWS channel and initiate establishment of a radio link on the new TVWS channel (1038/1040). This process may include, for example, downlink synchronization establishment 1032, timing advance 1034 and uplink allocation 1036. Once uplink activity has been established on the new TVWS channel, the WTRUs 1002 and 1004 may send respective ChannelChangeComplete messages 1042 and 1044 to the serving base station 1006 to notify it that channel changing has been completed. Prior to timing advance 1034, it may be assumed that the WTRUs 1002 and 1004 perform a contention based random access procedure. In another embodiment, it may be assumed that the propagation delay between the WTRUs 1002 and 1004 and the serving base station 1006 does not change significantly in the time it takes to change the channel. In this embodiment, a synchronized cell reconfiguration procedure, which does not require a random access channel (RACH), may be used.

In response to receiving the ChannelChangeComplete messages from all of the connected mode WTRUs, the serving base station 1006 may acknowledge the cell reconfiguration operation by sending ChannelChangeComplete acknowledgement (ACK) messages (e.g., ACK messages 1046 and 1048) to all of the connected mode WTRUs (e.g., WTRUs 1002 and 1004). In an embodiment, the serving base station 1006 may also inform a mobile management entity (MME) 1012 of the cell reconfiguration.

In the methods described above, the WTRUs are notified of changes in the operating frequencies of their current serving base stations. However, it may also be desirable to notify neighboring cells of any changes in base station operating frequency so that the neighboring base stations may update their SI accordingly. In an embodiment for an LTE system operating in the TVWS, the a base station changing its operating frequency may include in its SI broadcast not only information about its configuration but also information about the configuration of neighboring TVWS cells. This may be accomplished, for example, using an existing SIB or by adding an Information Element (IE) and/or SIB to carry this information. Accordingly, when a TVWS base station performs a cell reconfiguration, it may update the SI and corresponding SIBs to be consistent with the new operating frequency. In addition, neighboring cells in the network may also be notified of the cell reconfiguration so they can update their SI accordingly. To accomplish this, a TVWS base station may inform the network when performing a cell reconfiguration. In an embodiment, an X2interface between base station in an LTE network may be used to inform the other eNBs of the cell reconfiguration.

The methods described above may be implemented in any type of wireless network. Examples of wireless networks and architectures that may be particularly adapted for use with the above methods are illustrated and described with respect to FIGS. 11 and 12 below.

Figure 11:
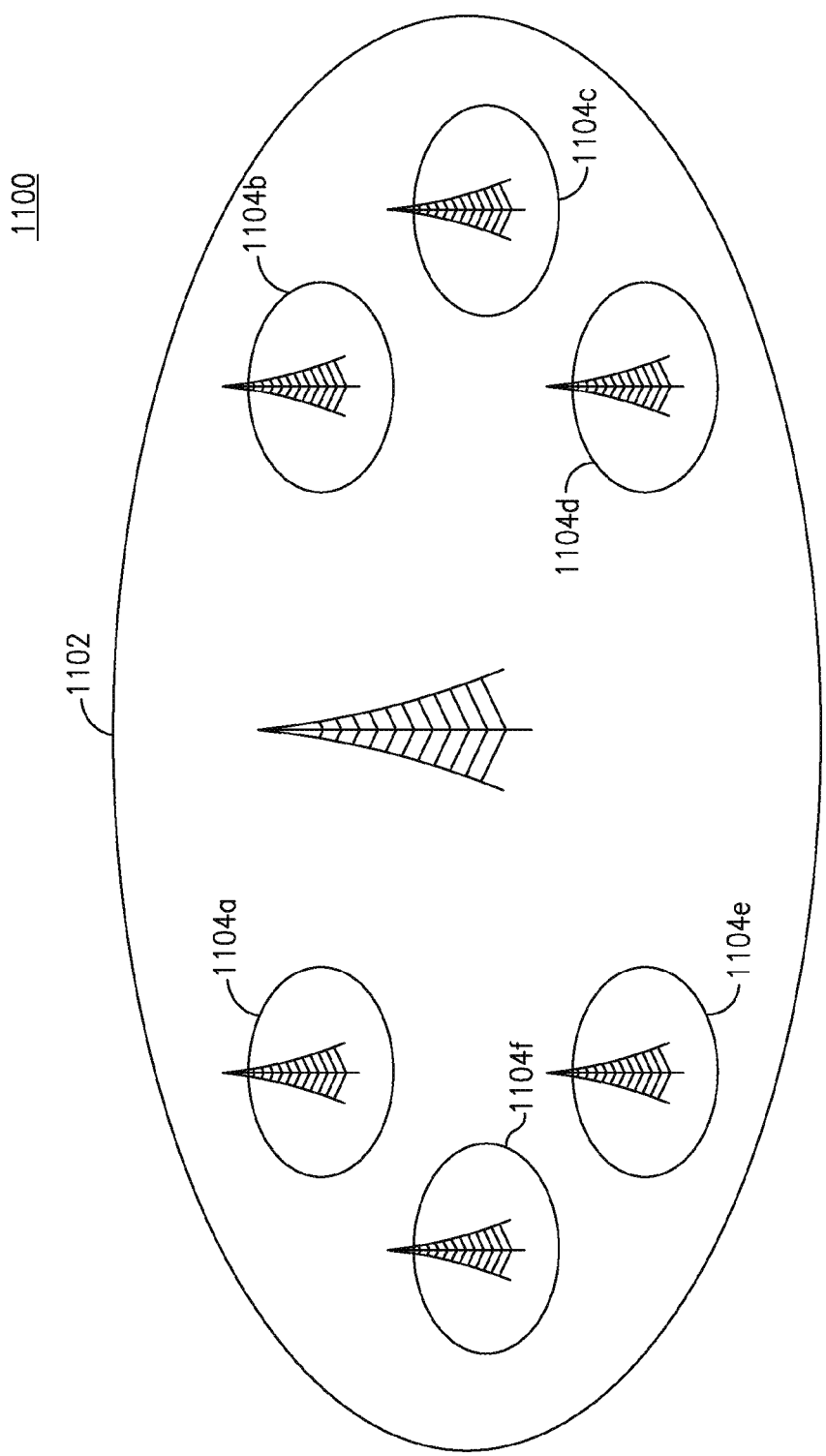
FIG. 11 is a diagram of an example long term evolution (LTE) network using TVWS.

FIG. 11 is a diagram 1100 of an example LTE network using TVWS. In the illustrated embodiment, the LTE network includes a heterogeneous architecture that includes an LTE macro cell 1102 and an underlay of TVWS pico/femto-cells 1104a, 1104b, 1104c, 1104d, 1104e and 1104f. The TVWS pico/femto-cells 1104a, 1104b, 1104c, 1104d, 1104e and 1104f may be low power pico/femto-cells and may be deployed, for example, to eliminate coverage holes or to improve capacity in areas with dense users (e.g., hot spots). In such an embodiment, the macro-cell 1102, which is assumed to operate using licensed band frequencies, may assist with eNB cell reconfiguration. While the embodiment illustrated in FIG. 11 shows a macro-cell 1102 that may assist with eNB cell reconfiguration, other cells (e.g., neighbor cells) may also assist with eNB reconfiguration.

An alternative to reconfiguring a WTRU such that it camps on the same base station after a cell reconfiguration may be to trigger the WTRU to perform a reselection to another suitable cell (e.g., the macro-cell 1102), prior to commencing cell reconfiguration. This may be accomplished, for example, by modifying the reselection criteria such that a neighbor-cell meets the requirements for cell reselection. The modified parameters used to control the cell reselection maybe provided to the WTRU in the SI or via dedicated signaling. In another embodiment, the serving base station may change its cell access related information such that it is considered barred. This may force the WTRUs to perform a cell reselection upon determining that the serving cell is barred. To reduce the cell reselection latency, the base station may page the WTRUs to indicate that a modification to the SI has occurred. Once the TVWS base station has completed the cell reconfiguration, the reselection criteria may be updated such that the original TVWS base station is reselected.

For some users/services, a reliable connection between a WTRU and a network must be maintained during the base station cell reconfiguration. If the latency associated with the base station cell reconfiguration may not be tolerated, the TVWS base station may handover a WTRU or a set of WTRUs to a neighbor-cell (e.g., the macro-cell 1102) prior to commencing cell reconfiguration. The list of WTRUs and the order in which they are handed-over to the neighbor-cell may be determined based on the QoS of the service being provided. The existing handover procedure or a multicast handover procedure may be used to perform handover from the TVWS pico/femto-cell to the neighbor-cell. Upon completion of the cell reconfiguration, the TVWS base station may notify neighboring base stations of its new operating frequency, at which time the new serving-cell(s) may perform a handover back to the original TVWS base station.

Figure 12:
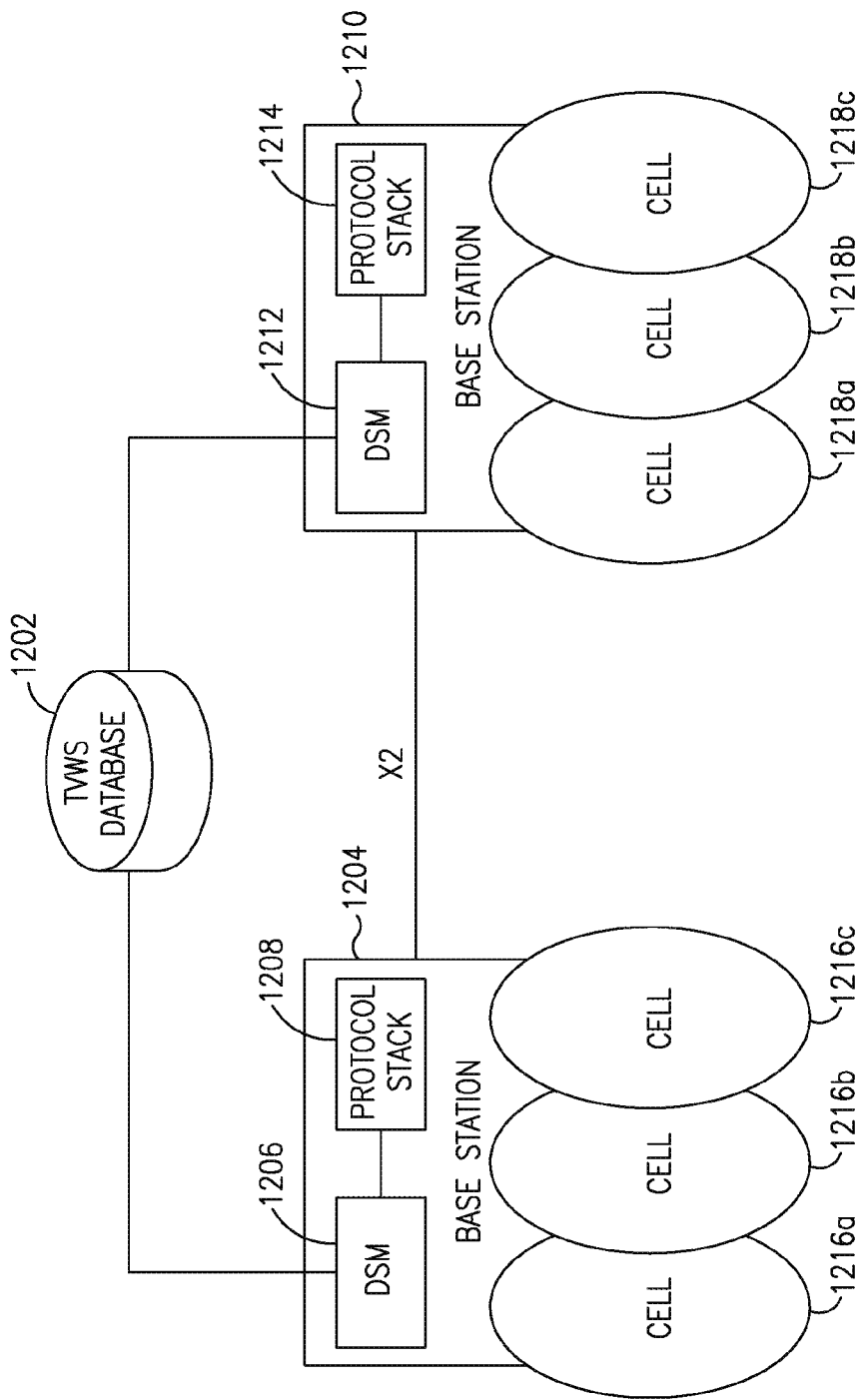
FIG. 12 is a diagram of an example architecture for an LTE system operating in the TVWS.

FIG. 12 is a diagram 1200 of an example architecture for an LTE system operating in the TVWS. The example architecture includes eNBs 1204 and 1210, each of which operates one or more of corresponding cells 1216a, 1216b and 1216c (corresponding to the eNB 1204) and 1218a, 1218b and 1218c (corresponding to the eNB 1210). Each of the eNBs 1204 and 1210 includes a respective dynamic spectrum management (DSM) unit 1216/1212 and protocol stack 1208/1214. The eNBs 1204 and 1210 may communicate with one another via an X2 interface. Each of the DSM units 1206 and 1212 may communicate with a TVWS dataset 1202.

The DSM units 1206 and 1212 may be responsible for managing the TVWS channels that are used for communication by the respective eNBs 1204 and 1210. The protocol stacks 1208 and 1214, for example, may provide measurement reports as inputs to the respective DSM units 1206 and 1212 and may provide channel selection/change decisions as outputs. The DSM units 1206 and 1212 may communicate with the TVWS database 1202, either directly or via at least one other TVWS eNB, to determine which TVWS channels are available for operation in the area being served by the respective eNBs 1204 and 1210.

The DSM units 1206 and 1212 may make decisions about channel availability based on queries to the TVWS database 1202, while decisions about channel quality may be determined based on measurement reports. A cell reconfiguration may be triggered by either a change in the channel's availability (e.g., if a query to the TVWS database indicates that a channel that is in use will no longer be available) or a change in the channel's quality. Decisions about channel selection/changes may be coordinated with DSM engines operating in other eNBs (e.g., the eNB 1204 may coordinate with the eNB 1210 in the example illustrated in FIG. 12) via the X2 interface.

Embodiments:

1. A method implemented in a wireless transmit/receive unit (WTRU), the method comprising communicating with a base station using a first base station operating frequency and a set of cell configuration parameters.

2. The method of embodiment 1, further comprising receiving information indicating a second base station operating frequency to use for communications with the base station at a given time.

3. The method of embodiment 2, further comprising communicating with the base station using the second base station operating frequency and the same set of cell configuration parameters on or after the given time.

4. The method of any one of embodiments 1-3, wherein the set of cell configuration parameters includes Radio Resource information elements (IEs) included in at least one of the RadioResourceConfigCommon IE and the RadioResourceConfigDedicated IE.

5. The method of any one of embodiments 1-4, further comprising receiving a trigger to change to the second base station operating frequency.

6. The method of embodiment 5, further comprising in response to receiving the trigger, changing to the second base station operating frequency for communication with the base station on or after the given time.

7. The method of any one of embodiments 1-6, further comprising receiving one of an instruction to initiate a directed cell reselection to a new cell to be operated by the base station at the given time and an instruction to initiate handover procedures to the new cell, the new cell corresponding to the second base station operating frequency and the second cell ID.

8. The method of embodiment 7, further comprising initiating one of the directed cell reselection or the handover to the new cell at the given time.

9. The method of any one of embodiments 1-8, wherein the WTRU is preconfigured with operating parameters of a plurality of cells operated by the base station, the method further comprising receiving a notification that a cell corresponding to a first cell ID will go dormant, and that a cell corresponding to a second cell ID will become active, at the given time.

10. The method of any one of embodiments 1-9, wherein receiving the information indicating the second base station operating frequency to use for communications with the base station at the given time includes reading system information (SI) from the base station.

11. The method of embodiment 10, further comprising receiving a trigger to read the SI broadcast by the base station in one of a paging message including a SystemInfoModification information element (IE) or a paging message including a Channelchange-Indication IE.

12. The method of any one of embodiments 1-11, wherein the WTRU is in a radio resource controller (RRC)_CONNECTED mode, and the receiving the information indicating the second base station operating frequency to use for communication with the base station at the given time includes receiving one of a multicast radio network temporary identifier (MC-RNTI) included in an RRCConnectionSetup message, a unicast message and a ChannelChange Command.

13. A wireless transmit/receive unit (WTRU) comprising a transceiving unit configured to communicate with a base station using a first base station operating frequency and a set of cell configuration parameters.

14. The WTRU of embodiment 13, wherein the transceiving unit is further configured to receive information indicating a second base station operating frequency to use for communications with the base station at a given time.

15. The WTRU of embodiment 14, wherein the transceiving unit is further configured to communicate with the base station using the second base station operating frequency and the same set of cell configuration parameters on or after the given time.

16. A method of changing an operating frequency of a base station, the method comprising communicating with a wireless transmit/receive unit (WTRU) using a first base station operating frequency.

17. The method of embodiment 16, further comprising determining to change the operating frequency of the base station.

18. The method of embodiment 17, further comprising responsive to determining to change the operating frequency of the base station, communicating with the WTRU using a second base station operating frequency.

19. The method of embodiment 17 or 18, wherein the determining to change the operating frequency of the base station is based on at least one of a presence of a primary user on the first base station operating frequency or interference from other secondary users on the first base station operating frequency that exceeds a predetermined interference level.

20. The method of any one of embodiments 16-19, further comprising transmitting instructions to the WTRU to either initiate a directed cell reselection to a new cell to be operated by the base station at a given time or initiate handover procedures to the new cell at the given time in response to its decision to change the operating frequency of the base station.

21. The method of any one of embodiments 16-20, further comprising grouping a plurality of WTRUs serviced by the base station into a plurality of multicast groups based on at least one WTRU-related characteristic.

22. The method of embodiment 21, further comprising assigning priority levels to each of the plurality of multicast groups.

23. The method of embodiment 22, further comprising transmitting the instructions via a separate multicast message to the plurality of multicast groups in order of priority level.

24. The method of any one of embodiments 16-23, wherein the base station is configured to operate a plurality of cells at the same time, the plurality of cells including a first cell corresponding to the first base station operating frequency and a second cell corresponding to the second base station operating frequency.

25. The method of any one of embodiments 16-24, wherein the WTRU is preconfigured with parameters for the plurality of cells.

26. The method of embodiment 24 or 25, further comprising instructing the WTRU that the first cell will become dormant, and the second cell will become active, at a given time.

27. The method of any one of embodiments 16-26, further comprising transmitting a notification to the WTRU of the change in operating frequency by changing a current base station operating frequency provided in a system information (SI) broadcast.

28. The method of embodiment 27, wherein the notification that the base station is going to change the SI is transmitted during a current modification period, the method further comprising broadcasting the SI with the changed current base station operating frequency during a next modification period.

29. The method of any one of embodiments 16-28, further comprising reducing a length of time of the modification periods on a condition that a quality of the current base station operating frequency is detected that is lower than a specified value but within working range.

30. The method of any one of embodiments 16-29, further comprising receiving at least one measurement report from the WTRU.

31. The method of embodiment 30, further comprising determining to change the operating frequency of the base station in response to information provided in the at least one measurement report.

32. The method of any one of embodiments 16-31, wherein the first and second base station operating frequencies are in the television white space (TVWS) band.

33. The method of any one of embodiments 16-32, wherein the first and second base station operating frequencies correspond to a pico-cell.

34. The method of embodiment 33, wherein in response to determining to change the operating frequency of the base station, triggering the WTRU to perform one of reselection or handover to a neighbor cell before reconfiguring the pico-cell to the second base station operating frequency.

35. The method of embodiment 34, wherein on a condition that reconfiguring the pico-cell to the second base station operating frequency is completed, triggering the WTRU to perform one of reselection or handover to the original pico-cell.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented in a wireless transmit/receive unit (WTRU), the method comprising:
   communicating with a base station using a first operating frequency in a license-exempt band, a set of cell configuration parameters, and a first modification period;
   receiving first information, the first information comprising an indication of a second modification period;
   communicating with the base station using the first operating frequency in the license-exempt band, the set of cell configuration parameters, and the second modification period;
   receiving second information, the second information comprising:
   an indication of a second operating frequency in the license-exempt band to use for communications with the base station, and
   an indication of a number of modification periods;
   determining a specified time based the number of modification periods; and
   communicating with the base station using the second operating frequency and the same set of cell configuration parameters at the specified time.

2. The method of claim 1, wherein the set of cell configuration parameters includes Radio Resource information elements (IEs) included in at least one of the RadioResourceConfigCommon IE and the RadioResourceConfigDedicated IE.

3. The method of claim 1, further comprising:
   receiving a trigger to change to the second operating frequency; and
   in response to receiving the trigger, changing to the second operating frequency for communication with the base station at the specified time.

4. The method of claim 3, further comprising:
   receiving at least one of an instruction to initiate a directed cell reselection to a new cell to be operated by the base station at the specified time or an instruction to initiate handover procedures to the new cell, the new cell corresponding to the second operating frequency and a second cell ID; and
   initiating one of the directed cell reselection or the handover to the new cell at the specified time.

5. The method of claim 1, wherein the WTRU is preconfigured with operating parameters of a plurality of cells operated by the base station, the method further comprising receiving a notification that a cell corresponding to a first cell ID will go dormant, and that a cell corresponding to a second cell ID will become active, at the specified time.

6. The method of claim 1, wherein receiving the first information includes reading system information (SI) from the base station.

7. The method of claim 6, further comprising receiving a trigger to read the SI from the base station in one of a paging message including a SystemInfoModification information element (IE) or a paging message including a Channelchange-Indication IE.

8. The method of claim 1, wherein the WTRU is in a radio resource controller (RRC)_CONNECTED mode, and receiving the second information includes receiving an extended handover command or a ChannelChangeCommand using a unicast addressing mechanism or multicast addressing mechanism with a multicast radio network temporary identifier (MC-RNTI) included in an RRCConnectionSetup message.

9. A wireless transmit/receive unit (WTRU) comprising:
a transceiver configured to:
communicate with a base station using a first operating frequency in a license-exempt band and a set of cell configuration parameters,
receive first information, the first information comprising an indication of a second modification period,
communicate with the base station using the first operating frequency in the license-exempt band, the set of cell configuration parameters, and the second modification period,
receive second information, the second information comprising an indication of a second operating frequency in the license-exempt band to use for communications with the base station, and an indication of a number of modification periods, and
communicate with the base station using the second operating frequency and the set of cell configuration parameters at a specified time; and
a processor configured to:
determine, based on the second information, the second operating frequency in the license-exempt band to use for communications with the base station,
determine, based on the second information, the number of modification periods, and
determine, based on the number of modification periods, the specified time for the transceiver to begin communicating with the base station using the second operating frequency.

10. A method of changing an operating frequency of a base station, the method comprising:
communicating with a wireless transmit/receive unit (WTRU) using a first operating frequency in a license-exempt band and a first modification period;
transmitting first information to the WTRU, the first information comprising an indication of a second modification period;
communicating with the base station using the first operating frequency in the license-exempt band and the second modification period;
determining to change the operating frequency used to communicate with the WTRU within the license-exempt band;
transmitting second information to the WTRU of the change in operating frequency, the second information comprising:
an indication of a second operating frequency in the license-exempt band, and
an indication of a number of modification periods that indicate a specified time for the WTRU to begin communicating with the base station using the second operating frequency; and
responsive to determining to change the operating frequency used to communicate with the WTRU, communicating with the WTRU using the second operating frequency in the license-exempt band.

11. The method of claim 10, wherein the determining to change the operating frequency used to communicate with the WTRU is based on at least one of a presence of a primary user on the first operating frequency or interference from other secondary users on the first operating frequency that exceeds a predetermined interference level.

12. The method of claim 10, further comprising transmitting instructions to the WTRU to either initiate a directed cell reselection to a new cell to be operated by the base station at the specified time or initiate handover procedures to the new cell at the specified time in response to its decision to change the operating frequency of the base station.

13. The method of claim 12, further comprising:
grouping a plurality of WTRUs serviced by the base station into a plurality of multicast groups based on at least one WTRU-related characteristic;
assigning priority levels to each of the plurality of multicast groups; and
transmitting the instructions via a separate multicast message to the plurality of multicast groups in order of priority level.

14. The method of claim 10, wherein:
the base station is configured to operate a plurality of cells at the same time, the plurality of cells including a first cell corresponding to the first operating frequency and a second cell corresponding to the second operating frequency,
the WTRU is preconfigured with parameters for the plurality of cells, and
the method further comprises instructing the WTRU that the first cell will become dormant, and the second cell will become active, at the specified time.

15. The method of claim 10, wherein the first information is transmitted in a system information (SI) broadcast.

16. The method of claim 15, wherein the first information is transmitted during a current modification period, the method further comprising broadcasting the SI with the changed current operating frequency during a next modification period.

17. The method of claim 16, further comprising reducing a length of time of the modification periods on a condition that a quality of the current operating frequency is detected that is lower than a specified value but within working range.

18. The method of claim 10, further comprising:
receiving at least one measurement report from the WTRU; and
determining to change the operating frequency used to communicate with the WTRU in response to the at least one measurement report.

19. The method of claim 10, wherein the first operating frequency and the second operating frequency are each in a television white space (TVWS) band.

20. The method of claim 10, wherein:
the first operating frequency and the second operating frequency correspond to a pico-cell,
in response to determining to change the operating frequency used to communicate with the WTRU, triggering the WTRU to perform one of reselection or handover to a neighbor cell before reconfiguring the pico-cell to the second operating frequency, and
on a condition that reconfiguring the pico-cell to the second operating frequency is completed, triggering the WTRU to perform one of reselection or handover to the original pico-cell.

* * * * *